United States Patent [19]
Ziegelhoffer

[11] Patent Number: 5,518,490
[45] Date of Patent: May 21, 1996

[54] APPARATUS AND METHOD FOR THE PRODUCTION OF ZIPPER-TYPE CLOSURE BAGS

[75] Inventor: Paul Ziegelhoffer, Greenleaf, Wis.

[73] Assignee: Paper Converting Machine Company, Green Bay, Wis.

[21] Appl. No.: 293,692

[22] Filed: Aug. 19, 1994

[51] Int. Cl.$^6$ .............................. B31B 1/64; B31B 23/10; B31B 23/16; B31B 23/64

[52] U.S. Cl. .............................. 493/193; 226/95; 226/172; 493/194; 493/197; 493/205

[58] Field of Search ..................... 493/193, 194, 493/195, 196, 197, 200, 201, 202, 203, 205, 206, 208, 214, 215, 224, 239, 267, 198, 266; 226/95, 172, 173

[56] References Cited

U.S. PATENT DOCUMENTS

| 3,004,881 | 10/1961 | Van Der Meulen | 493/197 |
|---|---|---|---|
| 3,640,050 | 2/1972 | Nystrand et al. | 53/120 |
| 3,901,754 | 8/1975 | Simpson | 493/203 |
| 4,176,000 | 11/1979 | Achelpohl | 493/194 |
| 4,198,259 | 4/1980 | van der Meulen | 493/203 |
| 4,214,509 | 7/1980 | van der Meulen | 493/201 |
| 4,300,893 | 11/1981 | Achelpohl | 493/194 |
| 4,557,713 | 12/1985 | Savich | 493/194 |
| 4,609,367 | 9/1986 | Savich | 493/194 |
| 4,632,667 | 12/1986 | McDonald et al. | 493/203 |
| 4,820,254 | 4/1989 | Ziegelhoffer | 493/194 |
| 4,867,735 | 9/1989 | Wogelius | 493/194 |
| 4,902,374 | 2/1990 | Smith et al. | 156/515 |
| 4,959,044 | 9/1990 | Smith et al. | 493/205 |
| 4,976,673 | 12/1990 | Smith et al. | 493/194 |
| 5,062,825 | 11/1991 | Smith et al. | 493/205 |
| 5,094,657 | 3/1992 | Dworak et al. | 493/208 |
| 5,211,619 | 5/1993 | Ziegelhoffer | 493/194 |
| 5,215,514 | 6/1993 | Flyghagen et al. | 493/205 |
| 5,226,870 | 7/1993 | Smith et al. | 493/205 |
| 5,306,384 | 4/1994 | Stutt | 226/95 |

FOREIGN PATENT DOCUMENTS 2922989   12/1979   Germany ............................... 493/197

Primary Examiner—Jack W. Lavinder
Assistant Examiner—Christopher W. Day
Attorney, Agent, or Firm—Tilton, Fallon, Lungmus & Chestnut

[57] ABSTRACT

An apparatus and method for producing zipper closure bags from a continuous tube which includes advancing the tube along a continuous path for travel with a rotating metering roll, the metering roll having circumferentially spaced apart ports corresponding to a bag width, and a receiving conveyor having vacuum port-equipped sealing bars for receipt of the tube from the metering roll and for providing across seals defining adjacent paths.

20 Claims, 4 Drawing Sheets

APPARATUS AND METHOD FOR THE PRODUCTION OF ZIPPER-TYPE CLOSURE BAGS

This invention relates to an apparatus and method for the production of zipper-type closure bags and, more particularly to the production of bags of different widths.

BACKGROUND AND SUMMARY OF INVENTION

Illustrative of the field of application of this invention are my prior U.S. Pat. Nos. 3,640,050, 4,820,254 and 5,211,619. Patents which have to do with producing bags of different widths are those using tucker mechanisms between sealing bars to force a greater amount of the bag between bars. These are the outward tuckers of U.S. Pat. Nos. 4,557,713 and 4,609,367 and the inward tuckers of U.S. Pat. No. 4,902,374. Tucking has drawbacks in web abuse, machine complexity and inducing tensions. Tucking during the clamping process also can produce slippage and distorted bag shapes.

According to the invention, a constant feed metering roll is employed in place of the prior art tuckers. This invention applies to both chain style sealing sections as well as drum style sealers. This results in the following benefits and advantages:

(1) allows constant web infeed velocity and tension, i.e., does not abuse the web with large tension variations, (2) reduced mechanical complexity, and (3) provides tension relief without extra motions or complexity.

More particularly, the apparatus for producing zipper closure bags from a continuous tube includes an elongated frame with means in the frame for advancing a continuous tube in a longitudinal path on the frame. The term "tube" as used herein can mean either a closed tube or a web folded on itself with an open longitudinally-extending side.

As indicated above, there is a metering roll rotatably mounted on the frame. Cooperating with the rotating metering roll is a nip roll rotatably mounted on the frame in contact with the metering roll and, for receiving the tube from the metering roll, I provide a sealing bar-equipped conveyor means movably mounted on the frame having a portion adjacent the metering roll.

The conveyor means is equipped with a plurality of equally spaced sealing bars extending in axial relation to the metering roll and the conveyor means has drive means synchronized with the metering roll rotating means. The metering roll itself has a plurality of circumferentially spaced, axially extending vacuum ports—with the port spacing corresponding to a desired bag width, and the sealing bars being spaced apart a distance no greater than the arcuate distance between adjacent ports whereby when successive segments of the tube are transferred from the metering roll to the sealing bars, a bag having a width greater than the sealing bar spacing will automatically buckle or drape between adjacent sealing bars.

As indicated previously, the invention is equally applicable to a straight chain or curved drum for carrying the sealing bars. It is also advantageous to provide the sealing bars in the conveyor means portion adjacent the metering roll with ports for applying vacuum to positively effect transfer of the tube from the metering roll to the conveyor.

Other advantages and objects of the invention may be seen in the ensuing specification.

BRIEF DESCRIPTION OF DRAWING

The invention is described in conjunction with the accompanying drawing, in which.

DETAILED DESCRIPTION

Figure 1:
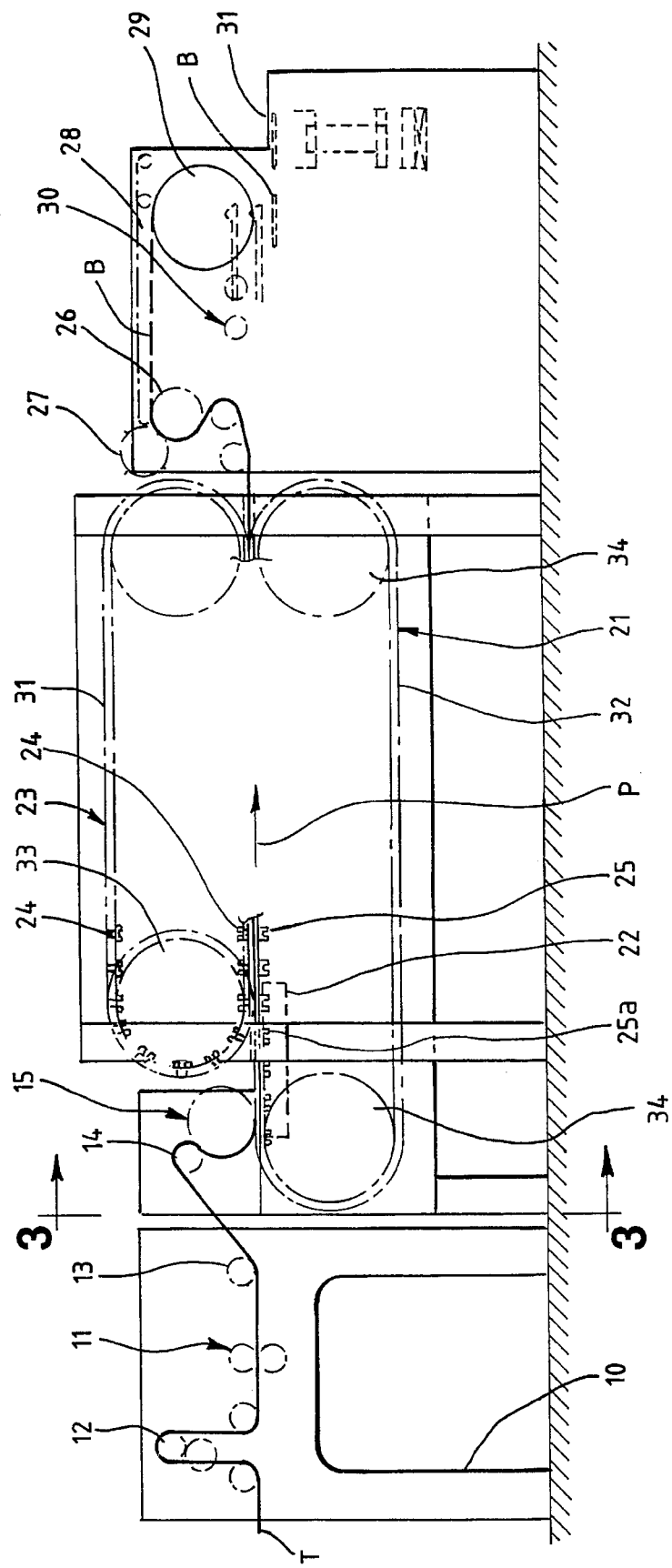
FIG. 1 is a side elevation of a chain style bag machine.

In the illustration given and with reference first to FIG. 1, the numeral 10 designates generally a relatively elongated frame which supports or coordinates the various apparatus elements. In accordance with conventional practice, the frame includes a pair of side frames 10a and 10b—see FIG. 3. The side frames provide an advantageous mounting for the various rolls, conveyors, etc.

Returning now to FIG. 1, the designation T designates a tube with a longitudinally extending zipper closure. The tube T can also be seen in FIG. 7 where the zipper closure is designated Z. As seen in the center of FIG. 1, the tube T is advanced along a longitudinally extending path P (also seen in FIG. 7 and which is parallel to the length of the side frames 10a, 10b ) by means of driven infeed rolls generally designated 11—see the extreme left hand portion of FIG. 1. The tube T, prior to engaging the infeed rolls 11 passes in partial wrapping engagement with a dancer roll 12 and, after passing the infeed rolls 11, passes in partial wrapping engagement with a tension roll 13. Thereafter, the tube T travels in partial wrapping engagement with a nip roll 14 and onto the metering roll generally designated 15. Here, the term "nip" is used in the general sense to define the relationship of two rolls, viz., rolls 14 and 15. The nip here allows the web to travel between the two rolls and, therefore the nip roll 14 is close but does not contact the metering roll 15. Alternative roll relationships may also be employed advantageously such as substituting a pair of rolls defining an S-shaped path in place of the nip roll.

Figure 3:
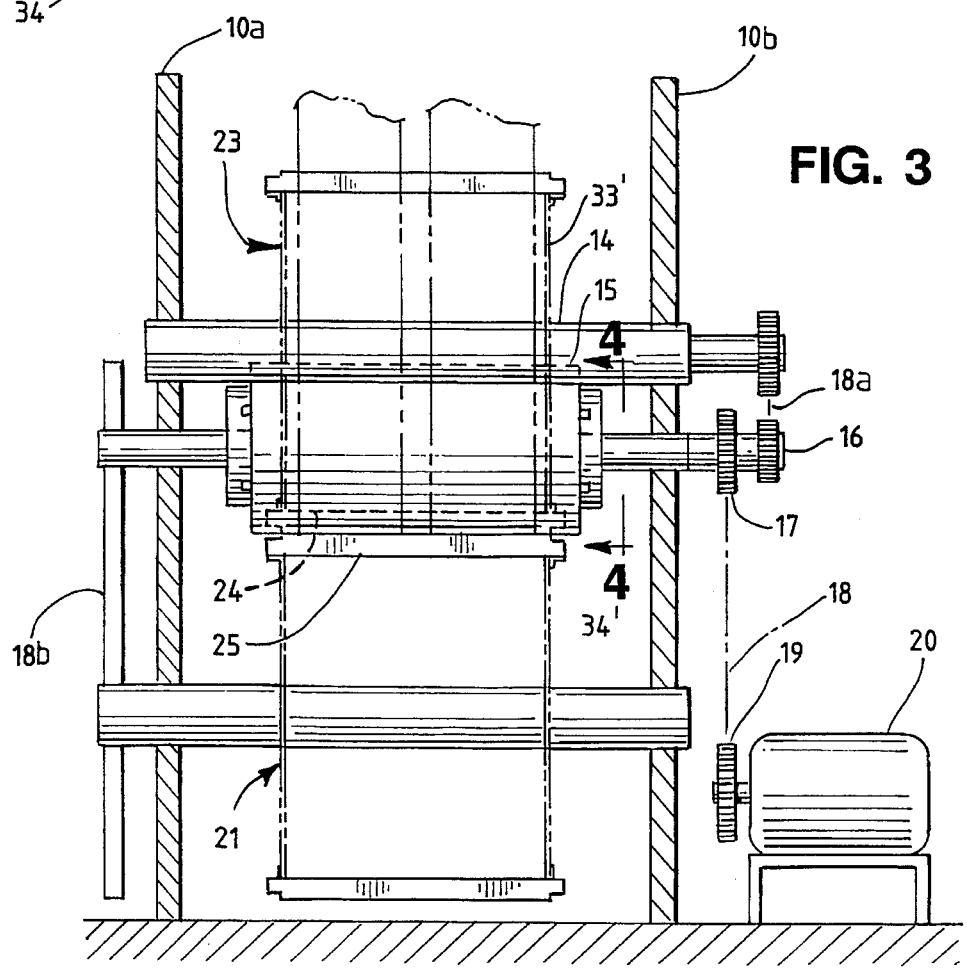
FIG. 3 is a front elevational view of the web infeed area as seen in FIG. 2.

Now focusing on the metering roll 15 and as seen in the right hand portion of FIG. 3, the metering roll 15 is equipped with a shaft 16 which is suitably rotatably mounted within the side frames 10a, 10b and is equipped with a pulley 17. A cog belt drive 18 couples the pulley 17 to a gear 19 carried by the drive motor 20. Alternatively the drive 18 may be a series of gears or the like and this same drive is advantageously employed to drive via drives 18a, 18b, the infeed rolls 11, the nip roll 14 and the conveyors to be described hereinafter.

Before going into the details of construction and operation of the metering roll infeed arrangement, the remainder of the apparatus in FIG. 1 will be described.

In the central part of FIG. 1, the numeral 21 designates generally the lower conveyor and the numeral 22 a vacuum chamber. The numeral 23 designates generally the upper conveyor which is equipped with a plurality of sealing bars or clamps 24. In like fashion, the lower conveyor is equipped with a plurality of equally spaced apart sealing bars 25.

Figure 7:
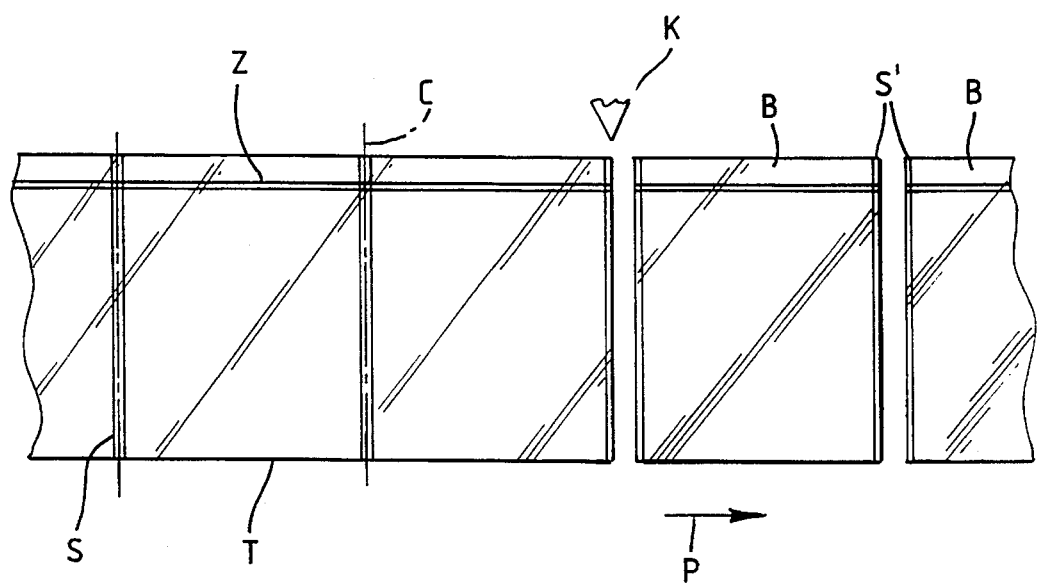
FIG. 7 is a schematic plan view of a zipper-closed bag tube with sealed and separated areas.

Once the tube has been engaged by the bars 24, 25 it is cross sealed in the fashion designated S in FIG. 7. These normally have a width of about ¼" to about 5/16", viz., about 6 to about 8 mm. Also seen in FIG. 7 is a line of potential severance or cutting C which is effected by a knife schematically represented at K to develop a sequence of bags B each of which has a pair of side seals as at S'.

Once the sealing has been concluded, the bars clamps 24, 25 can be released and the tube (now cross sealed) is advanced under the positive engagement of a vacuum anvil roll 26 in combination with a knife-equipped pinch roll 27. Cooperating with the vacuum anvil roll is a vacuum-equipped transverse belt 28 and ultimately a vacuum transfer roll 29. This works in conjunction with an orbital packer generally designated 30 to provide individual bags B which are then translated for packaging as at 31. The portion of the apparatus to the right of the ends of the conveyors 21, 23 is essentially conventional for handling a stream of connected zipper closure bags.

Also generally conventional are the sealing bars 24, 25 which are mounted on chains as at 31 and 32—depicted only schematically at the top and bottom center of FIG. 1. The chains in turn are entrained on sprockets such as the head sprocket 33 for the upper conveyor 23—see also FIG. 313 and 34 for the lower conveyor 21. Now turning to FIG. 2 the inventive metering roll will be described in greater detail.

Metering Roll 15

Figure 4:
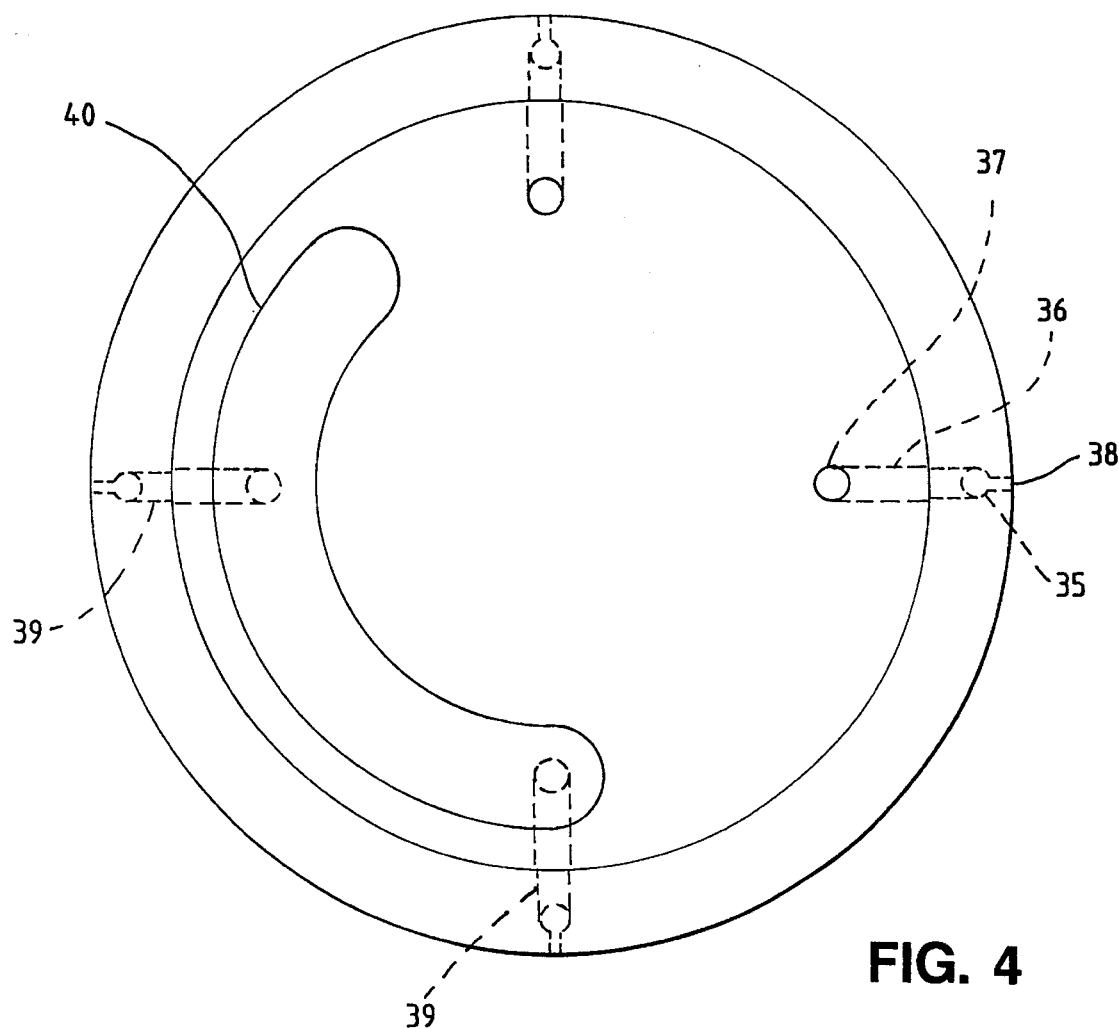
FIG. 4 is an enlarged side elevational view of the metering roll of the invention as seen along the sight line 4—4 applied to FIG. 3.

As seen in FIG. 4, the metering roll 15 is equipped with a plurality of equally circumferentially spaced apart axially-extending vacuum manifolds as at 35—see the manifold at 3 o'clock. Each manifold 35 is connected by a radially extending passage 36 to a primary manifold 37—which also extends axially. The first mentioned manifold 35 is equipped with a series of axially-spaced ports or opening as at 38 to insure good contact of the tube with the surface of the metering roll. As illustrated, the ports 39 (at 9 o'clock and 6 o'clock) are connected to a vacuum valve 40. As the metering roll 15 rotates in the direction of the arrow applied thereto in FIG. 2, each port 35 or 39 ultimately contacts the tube T which is traveling in partially wrapped engagement with nip roll 14 and applies a negative pressure to the tube. Thus, atmospheric pressure urges the tube T against the roll 15—as by operation of the ports 39.

So, a length or segment of tube T between the ports 39 is clamped by atmospheric pressure against the periphery of the metering roll 15 as it rotates from about the 10:30 o'clock position to about the 6:00 o'clock position, i.e., proceeding counterclockwise. The metering roll 15 is equipped with a peripheral shell having the equally spaced apart ports—four as shown—which have a circumferential spacing equal to the desired bag width. Here the term "width" is used in the sense of the zipper closure bag art and corresponds to the dimension parallel to the length of the zipper type closure.

Normally, the spacing between adjacent sealing clamps 25, 25, etc. will be less than the circumferential spacing of adjacent vacuum ports in the metering roll 15. This then necessarily develops a slack or drape in the tube T as at D in FIG. 2.

Figure 5:
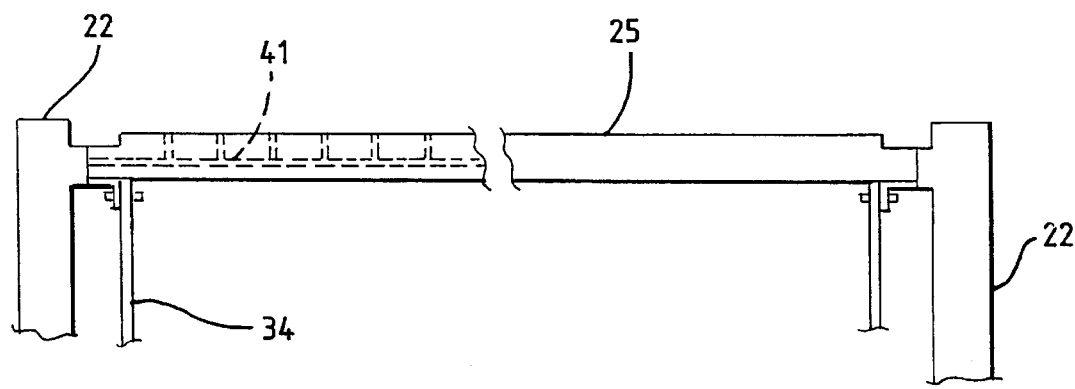
FIG. 5 is an enlarged fragmentary front elevational view of the clamping bars of FIGS. 1–3 as would be seen along the sight line 5—5 applied to FIG. 2.
Figure 6:
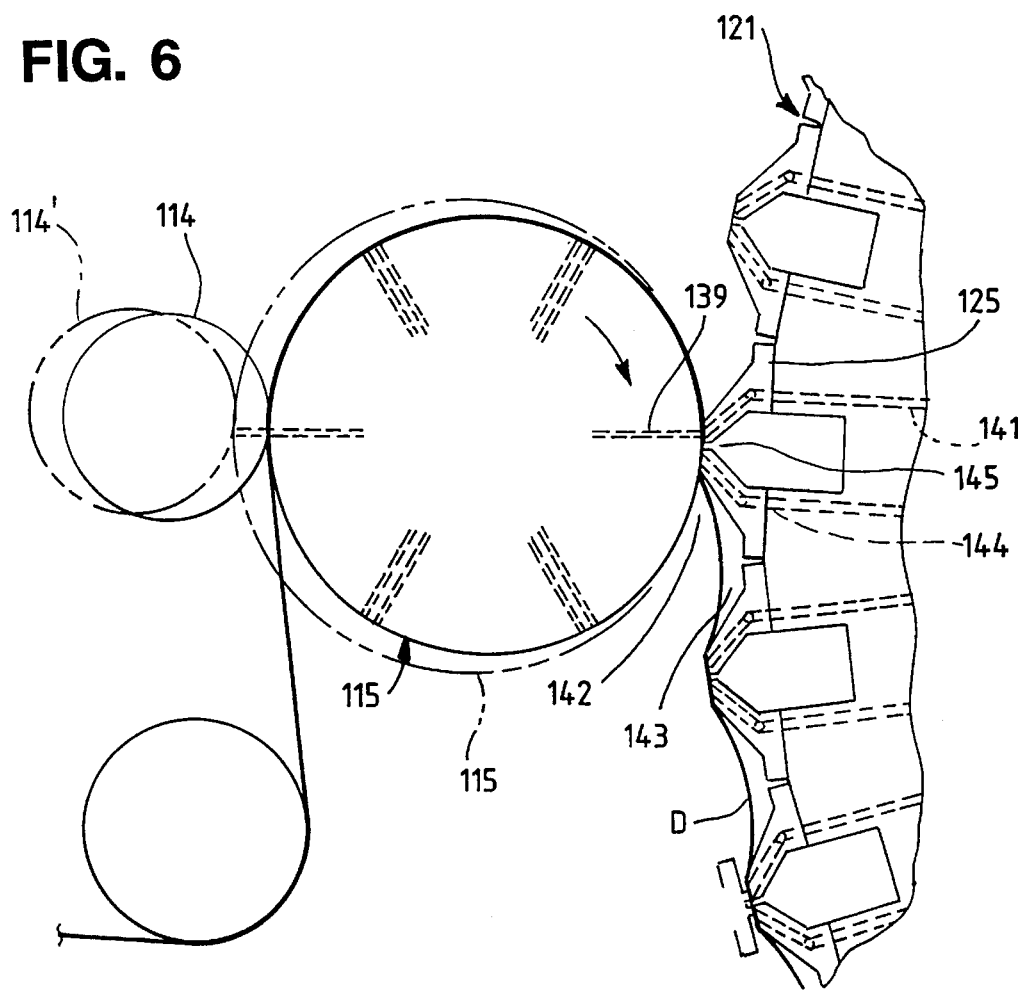
FIG. 6 is a side elevational view of a drum sealer equipped with the invention.

In order to get this desirable drape—which could be considered as a buckled tube because of the stiffness in the zipper-type closure—there is a speed difference between the surface speed of the metering roll 15 and the lower conveyor 21. This velocity difference is only important during the clamp or sealing bar contact with the metering roll—but the time of contact is short. The vacuum valve 40 is constructed so that the vacuum releases the bag from the metering roll simultaneously with the vacuum grip provided by the sealing bar 25. This vacuum grip is developed by a bore or passage 41 within the bar which communicates the upper or confronting side of the bar with the vacuum chamber 22—see the central portion of FIG. 2 and FIG. 5.

The vacuum chamber 22 includes or is aligned with a portion 42 of the conveyor 21 which is adjacent the metering roll 15. Thus, a sealing bar 25 which may be directly under the metering roll 15—at the 6:00 o'clock position, will be in confronting relation to a port 39 of the metering roll. By discontinuing the vacuum applied to the confronting port—as by the terminating of the valve 40 at 40' (see FIG. 2) and applying vacuum (via box 22) to a bar 25 aligned with the 6 o'clock port 39, transfer of the tube from the roll 15 to the conveyor 21 is achieved. So, the operation of these elements brings about transfer of a series of moving segments of the tube T. This cooperation brings about the advantages previously mentioned, particularly not abusing the tubular web with large tension variations. Also, in the prior art, the clamping while tucking could produce slippage of the tube between the preceding clamp bars 24, 25 and distort the shape of the bags B. Suitable sealing or clamp bars may be of the type in my earlier U.S. Pat. No. 5,211,619.

Embodiment of FIG. 4

Figure 2:
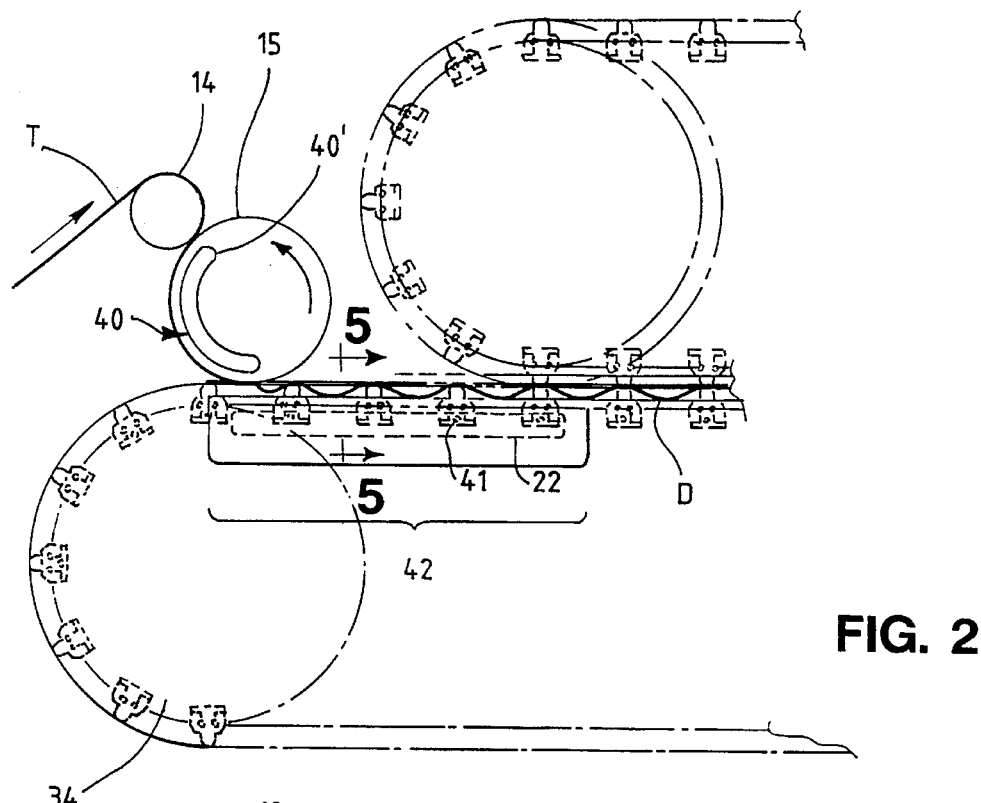
FIG. 2 is a fragmentary portion of FIG. 1 showing in enlarged scale the tube infeed area.

Instead of mounting the bars 25 on a horizontally elongated conveyor 21 as seen in FIGS. 1 and 2, they can be provided as part of a drum which is shown fragmentarily and designated generally 121 in FIG. 4. Also seen in FIG. 4 is the metering roll which is generally designated 115 and the nip roll 114. The drape D is accommodated by recesses 143 within the external surface of the drum 121.

In the illustration given in FIG. 4, the metering roll 115 is a "six-time" roll, i.e., has a circumference accommodating six bag widths. There is a vacuum port 139 in confronting relation with a sealing bar 125 on the drum 121. Vacuum is applied to the bar 125 through a passage 141 communicating with a vacuum pump 1 (not shown). Cooperating clamping bars 124 are provided on a second conveyor (not shown) but which performs the same function as the conveyor 23 in the embodiment of FIGS. 1–3.

It will be appreciated that it is quite advantageous to change the bag width by changing the metering roll arcuate or circumferential length which can either be done by replacing the metering roll with one of a different circumference and repeat length or a quick change metering roll using a permanent base vacuum roll and replacement sleeves which provide the desired bag length at the metering roll surface—see the phantom line showings 115' and 114' in FIG. 4. A servo electronic drive means is advantageous when the number of repeats on the metering roll is frequently changed, i.e., from five 6" bags for example to six 5" bags.

The invention also includes the variation of making slight bag length adjustments whereby the tube is made to slip on the metering roll. This results in bag length shorter than the metering roll repeat length by taking back some of the slack generated between sealing bars. Also available through the practice of the invention is the ability to make slight bag width adjustments whereby the infeed tension is increased or decreased prior to lay down on the metering roll.

Summary of Structure

The inventive apparatus for producing zipper closure bags B from a continuous tube T includes an elongated frame 10 with side frames 10a, 10b (compare FIGS. 1 and 3). There are infeed roll means 11 on the frame for advancing the continuous tube longitudinally of the frame. A metering roll 15 is rotatably mounted on the frame and motor means 20 are operably associated with the frame for rotating the metering roll 15. A nip roll 14 is rotatably mounted on the frame 10 adjacent to but slightly spaced from the metering roll 15.

The apparatus includes a sealing bar-equipped conveyor 21 which is movably mounted on the frame via sprockets 34, 34'. It has a run portion 42 over the vacuum box 22 adjacent the metering roll 15—see FIG. 2. The conveyor 21 has a plurality of equally spaced, vacuum port-equipped sealing clamps or bars 25 extending in axial relation to the metering roll. The apparatus includes drive means as at 19, 19a, 19b operably associated with the frame for synchronizing the movement of the conveyor 21 with the rotation of the metering roll 15. Cooperating with the conveyor 21 is a second conveyor 23 entrained around sprockets 33, 33'.

The metering roll 15 has a plurality of circumferentially spaced, axially extending vacuum ports 35 and 39 with the port circumferential spacing corresponding to a desired bag width. The apparatus includes means in the form of the placement and/or length of the vacuum valve 40 and vacuum chamber 22 for synchronizing the application and removal of vacuum relative to the ports 39 and sealing bars 25 so as to transfer the tube T from the metering roll 15 to the conveyor 21.

The sealing bars 25 are spaced apart a distance no greater than the circumferential distance between adjacent ports 39 whereby when the tube T is transferred from the metering roll to the sealing bars, a bag having a width greater than the sealing bar spacing will automatically buckle or drape between adjacent sealing bars 25 as at D in FIG. 2.

Summary of Operation

The inventive method for producing zipper closure bags from a continuous tube T includes the steps of advancing a continuous tube along a longitudinally-extending path P with the tube being equipped with a longitudinally-extending zipper closure. I provide a rotating metering roll 15 in the path—the roll 15 having a companion nip roll 14 defining with roll 15 a nip or spacing through which the tube T advances.

The rotating metering roll has a plurality of circumferentially-spaced, axially extending vacuum ports 35–38 with the spacing between adjacent ports corresponding to a desired bag width. Vacuum is selectively applied to the ports to serially urge successive moving segments of the advancing tube against the rotating metering roll.

I also provide a sealing bar-equipped conveyor 21, 121 moving in the path P and having a run portion 42, 142 adjacent the metering roll 15. This conveyor 21 or 121 has a plurality of equally spaced, vacuum-equipped sealing bars 25 extending in axial relation to the metering roll. The sealing bars are spaced apart a distance no greater than the circumferential distance between adjacent ports such as at 39, 39 in FIG. 4.

The operation includes synchronizing the movement of the conveyor 21, 121 with the rotation of the metering roll 15 to serially position a sealing bar 25, 125 in the run portion 42, 142 over the vacuum means 22, 41, 141 and in confronting relation to a port 39 adjacent the run portion. It further includes selectively removing the vacuum from the port 139 in FIG. 4 for example, adjacent the run portion 142 while applying vacuum to the sealing bar 125 in confronting relation to that port 139 to transfer the successively moving segments from the metering roll 115 to the conveyor of drum 121. The operation also includes buckling the tube T between adjacent sealing bars to create slack web whenever a bag has a width greater than the spacing between adjacent sealing bars.

In order to keep the vacuum ports (141 or 41) from interfering with the sealing process (either hot wire or pressure seal), it is also advantageous to offset the ports from the seal area, forming two rows of vacuum (i.e., 141 and 144). One of the rows of ports, 141, should be aligned with the feed roll parts—this will define the position of web transfer. The second set of ports 144 (on the other side of the seal location 145) will be connected to the vacuum source some time shortly after transfer. In this way, the seal area of the tube is fully held by vacuum while still allowing a precise transfer timing.

While in the foregoing specification a detailed description of an embodiment of the invention has been set down for the purpose of illustration, many variations in the details hereingiven may be made by those skilled in the art without departing from the spirit and scope of the invention.

I claim:

1. In an apparatus for producing zipper closure bags from a continuous tube, an elongated frame, means on said frame for advancing a continuous tube longitudinally of said frame, a metering roll rotatably mounted on said frame, means operably associated with said frame for rotating said metering roll, said metering roll having a plurality of circumferentially spaced, axially extending vacuum port means, said metering roll port means spacing corresponding to a desired bag width, a sealing bar-equipped conveyor means movably mounted on said frame having a run portion adjacent said metering roll, said conveyor means having a plurality of equally spaced, vacuum port-equipped sealing bars extending in axial relation to said metering roll, means operably associated with said frame for synchronizing the movement of said conveyor means with the rotation of said metering roll to position a sealing bar in said run portion aligned with said metering roll port means, vacuum application means on said frame for, synchronizing the application and removal of vacuum from said metering roll port means to transfer said tube from said metering roll to said conveyor means, said sealing bars being spaced apart a distance no greater than a circumferential distance between adjacent port means whereby when said tube is transferred from said metering roll to said sealing bars, a bag having a length greater than said sealing bar spacing is formed to thereby create a slack tube between adjacent sealing bars.

2. The apparatus of claim 1 in which said frame is equipped with second conveyor means, said second conveyor means being equipped with sealing bar means for clamping engagement with the sealing bars of the first mentioned conveyor means.

3. The apparatus of claim 1 in which said conveyor means is an elongated endless conveyor having an upper and a lower run, said upper run being equipped with said portion adjacent said metering roll.

4. The apparatus of claim 3 in which said frame is equipped with second conveyor means, said second conveyor means also being endless, elongated and equipped with sealing bar means for clamping engagement with the sealing bars of the first mentioned conveyor means.

5. The apparatus of claim 1 in which said conveyor means is a cylindrical drum.

6. The apparatus of claim 5 in which said frame is equipped with second conveyor means, said second conveyor means being equipped with sealing bar means for clamping engagement with the sealing bars of the first mentioned conveyor means.

7. The apparatus of claim 1 in which means are operably associated with said frame for slipping said tube relative to said metering roll to make slight adjustments in bag width.

8. The apparatus of claim 1 in which said frame is equipped with a nip roll adjacent said metering roll and means are operably associated with said frame for adjusting the tension in said tube prior to the tube containing said nip roll and said metering roll to make slight adjustments in bag width.

9. The apparatus of claim 1 in which said synchronizing means provides different speeds in said metering roll and said conveyor means.

10. The apparatus of claim 1 in which vacuum means are mounted on said frame in alignment with said conveyor means portion.

11. The apparatus of claim 1 in which a nip roll is rotatably mounted on said frame and slightly spaced from said metering roll.

12. The apparatus of claim 1 in which each sealing bar is equipped with an axially-extending seal location and a row of vacuum ports on each side of said seal location.

13. In a method for producing zipper closure bags from a continuous tube, the steps of advancing a continuous tube along a longitudinally-extending path, said tube being equipped with a longitudinally-extending zipper closure, providing a rotating metering roll in said path, said rotating metering roll having a plurality of circumferentially-spaced, axially extending row of vacuum ports, the spacing between adjacent rows corresponding to a desired bag width, selectively applying vacuum to said rows to serially urge successive moving segments of said advancing tube against said rotating metering roll, providing a sealing bar-equipped conveyor means moving in said path and having a run portion adjacent said metering roll, said conveyor means having a plurality of equally spaced, vacuum-equipped sealing bars extending in axial relation to said metering roll, said sealing bars being spaced apart a distance no greater than a circumferential distance between adjacent rows, synchronizing the movement of said conveyor means with the rotation of said metering roll to serially position a sealing bar in said run portion in confronting relation to a row adjacent said run portion, selectively removing the vacuum from said row adjacent said run portion while applying vacuum to said sealing bar in said confronting relation to transfer said successively moving segments from said metering roll to said conveyor means and creating a slack tube between adjacent sealing bars when a bag has a width greater than the spacing between adjacent sealing bars.

14. The method of claim 13 in which said steps include changing the spacing of said metering roll rows of ports to change the bag width.

15. The method of claim 14 in which said steps also include changing the circumference of said metering roll.

16. The method of claim 14 in which said steps include replacing the periphery of said metering roll.

17. The method of claim 13 in which said steps include slipping said tube relative to said metering roll to make slight adjustments in bag width.

18. The method of claim 13 in which said steps include adjusting the tension in said tube prior to contacting said metering roll to make slight adjustments in bag width.

19. The method of claim 13 in which said steps include positioning a nip roll close to but not contacting said metering roll.

20. The method of claim 13 in which said steps includes providing each sealing bar with an axially extending seal recess and flanking said recess with first and second rows of axially extending vacuum ports, one on each side of said recess, said first row being in confronting relation to a metering roll row of ports during said segment transfer, and thereafter applying vacuum to said sealing bar second row of ports.

* * * * *